Figure 5:
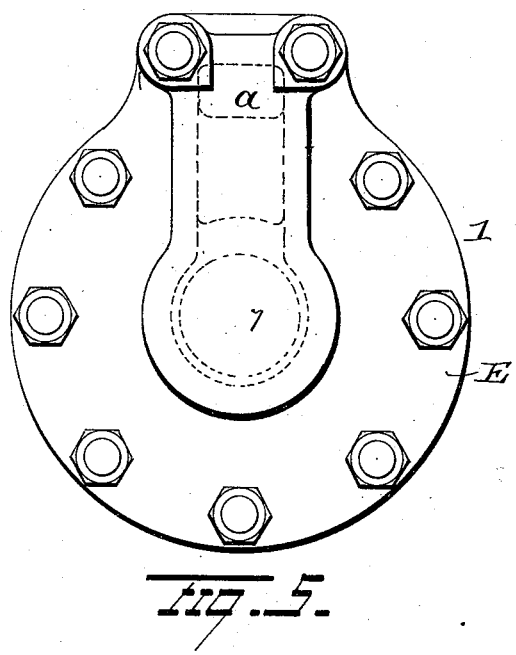
Figure 5A:
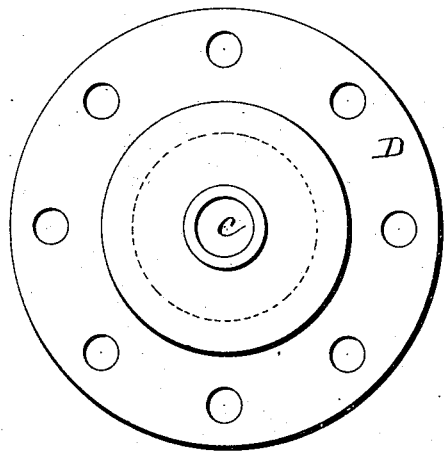

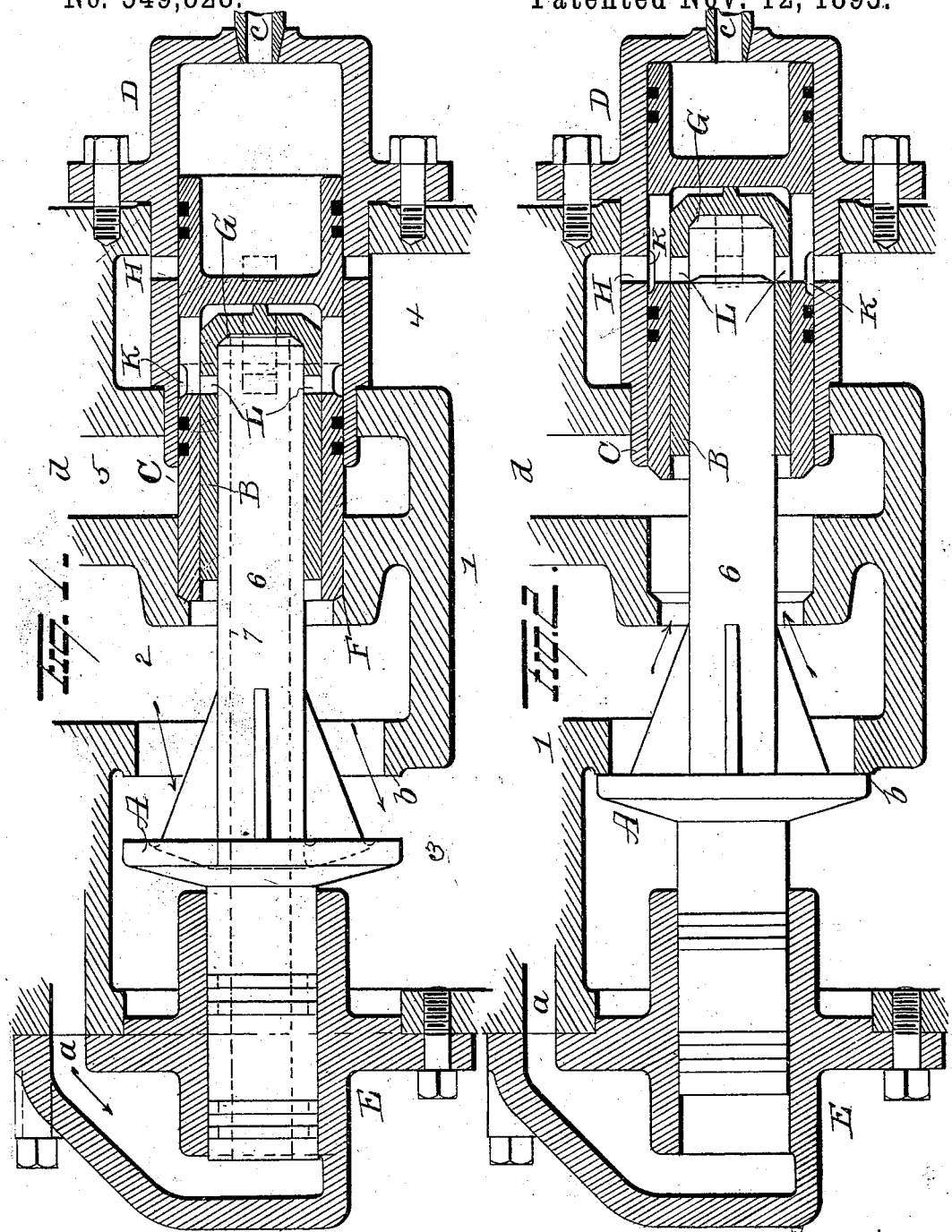

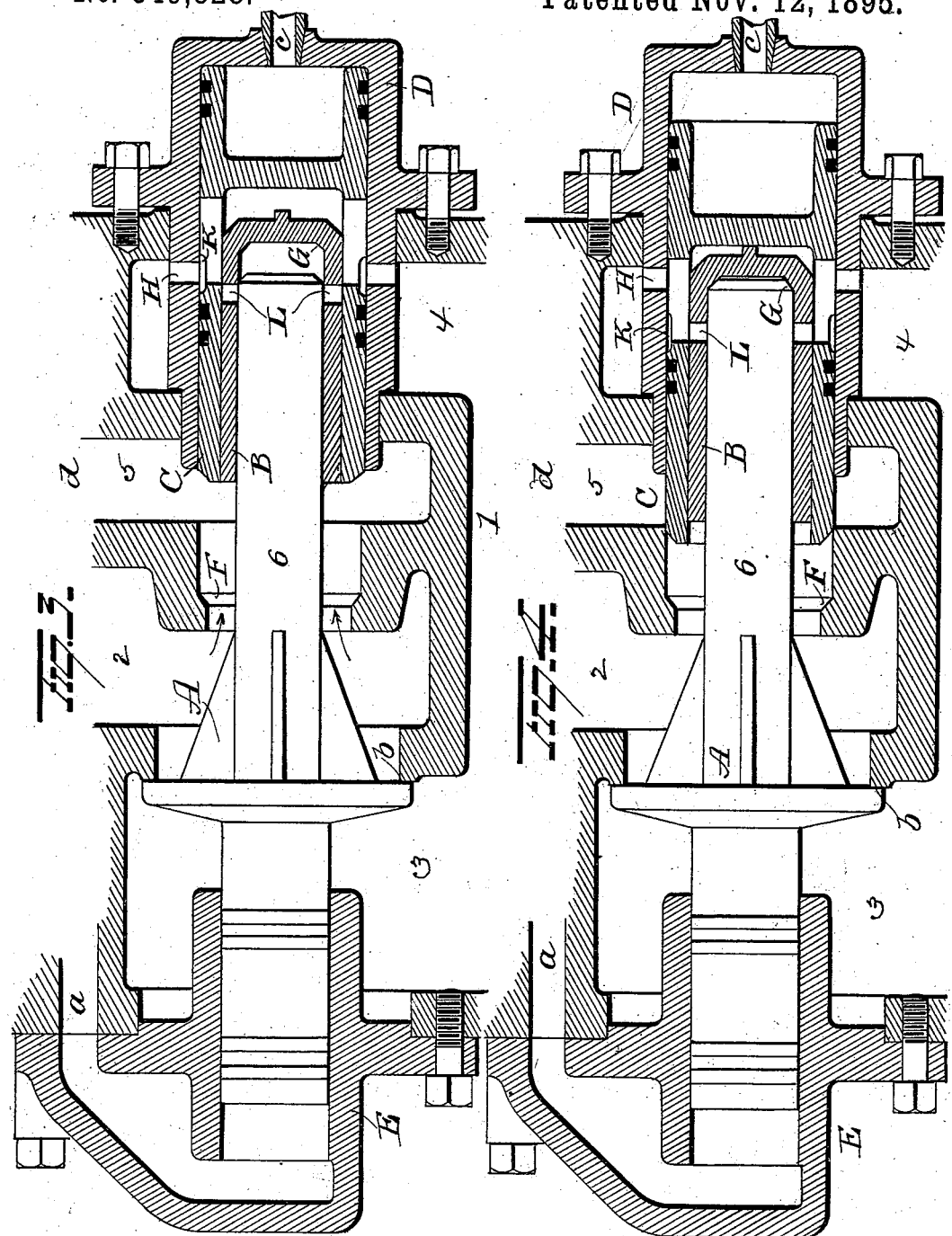

(No Model.) 5 Sheets—Sheet 3.

D. SHIRRELL.
VALVE MECHANISM FOR COMPOUND ENGINES.

No. 549,828. Patented Nov. 12, 1895.

Witnesses
E. J. Nothingham
Geo. Foster.

Inventor
David Shirrell
By H. A. Seymour.
Attorney (No Model.) 5 Sheets—Sheet 4.
D. SHIRRELL.
VALVE MECHANISM FOR COMPOUND ENGINES.
No. 549,828. Patented Nov. 12, 1895.
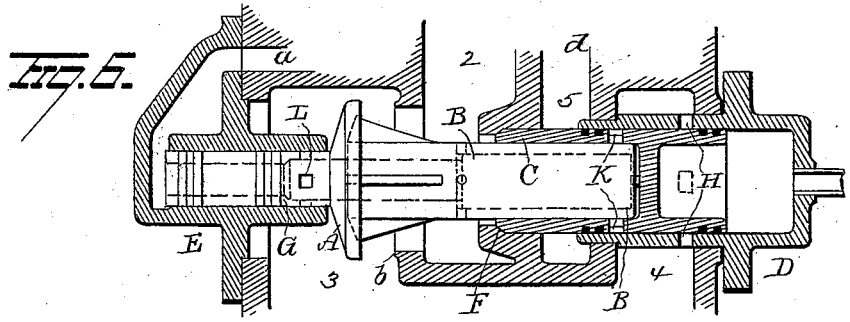
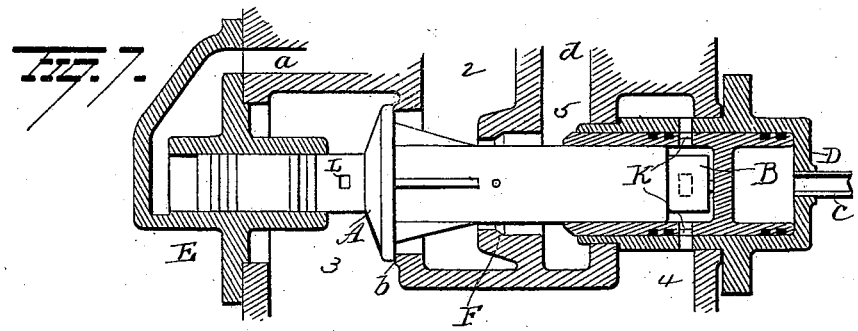
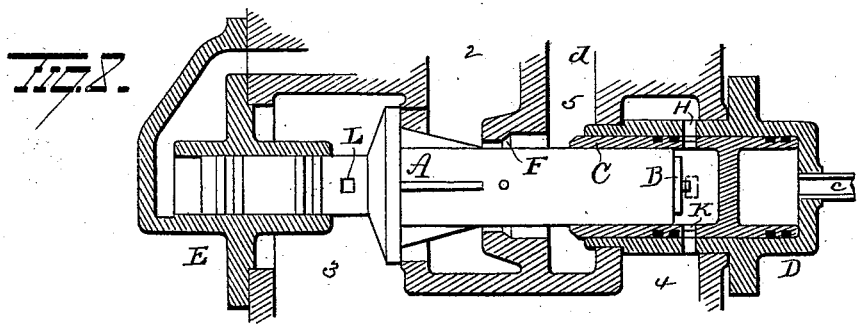
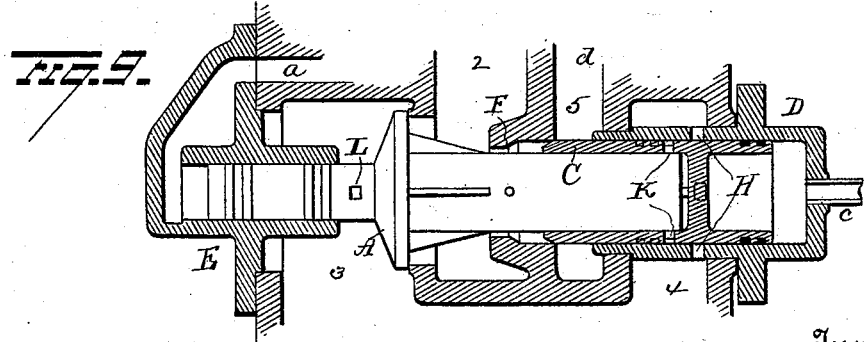
Witnesses
E. J. Nottingham
S. W. Foster
Inventor
David Shirrell
By H. A. Seymour.
Attorney

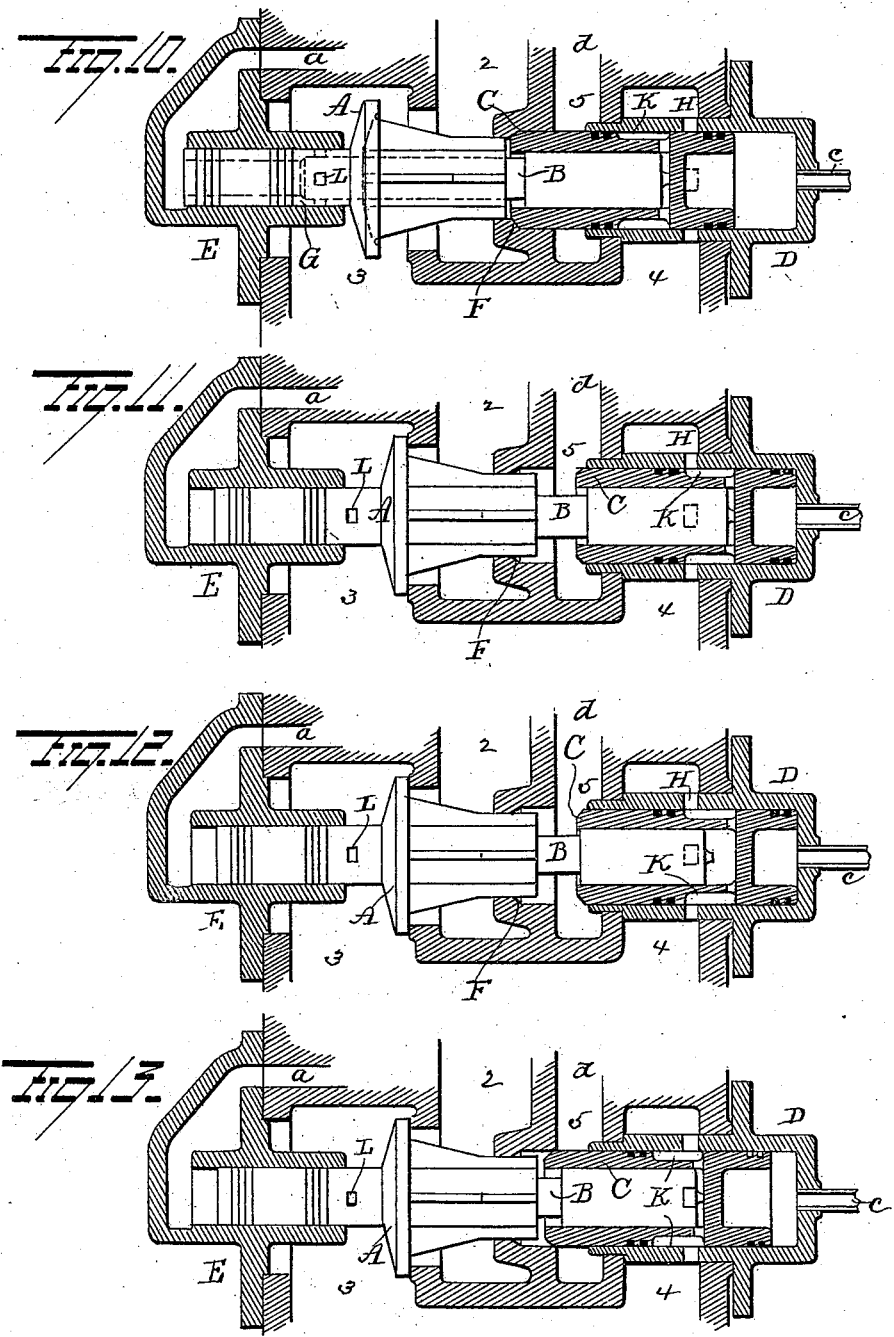

UNITED STATES PATENT OFFICE.

DAVID SHIRRELL, OF RICHMOND, VIRGINIA.

VALVE MECHANISM FOR COMPOUND ENGINES.

SPECIFICATION forming part of Letters Patent No. 549,828, dated November 12, 1895.

Application filed July 6, 1894. Serial No. 516,738. (No model.)

*To all whom it may concern:*

Be it known that I, DAVID SHIRRELL, a resident of Richmond, in the county of Henrico and State of Virginia, have invented certain new and useful Improvements in Valve Mechanism for Compound Engines; and I do hereby declare the following to be a full, clear, and exact description of the invention, such as will enable others skilled in the art to which it appertains to make and use the same.

My invention relates to an improvement in steam-engine valve mechanism, and more particularly to an improved intercepting, reducing, and independent exhaust-valve intended for use in connection with a compound locomotive-engine.

The object of the invention is to produce simple and efficient means whereby to convert a compound into a simple-acting engine, and vice versa, when the engine is running at any speed by the operation of a valve in the cab of the locomotive or at any other convenient place.

A further object is to produce valve mechanism which shall be so constructed that a locomotive can be run at any desired speed either as a compound or a simple-acting engine.

A further object is to so construct valve mechanism for a locomotive-engine that the whole adhesive power of the engine will be made available for use at any moment, and the limitations as to power and speed on grades, to which the compound locomotive has hitherto been subject, are here overcome.

A further object is to so construct said valve mechanism that when the compound engine is running as such all the steam from the high-pressure cylinder will pass to the low-pressure cylinder and so that there will be no movement of any of the parts of said valve mechanism when the engine is running as a compound engine.

A further object is to so construct said valve mechanism that when the engine is running as a simple engine there can be no movement of any of the parts of said valve mechanism, except a movement of the reducing-valve, which is free to move back and forth on the stem of the intercepting-valve and inside of the exhaust-valve for the high-pressure cylinder.

A further object is to so construct said valve mechanism that when the engine is running as a simple engine the exhaust from the high-pressure cylinder will be perfectly free.

A further object is to produce valve mechanism for the purpose above stated which shall be simple in construction and effectual in all respects in the performance of its functions.

With these objects in view the invention consists in certain novel features of construction and combinations and arrangements of parts, as hereinafter set forth, and pointed out in the claims.

In the accompanying drawings, Figure 1 is a sectional view showing the positions of the parts when the engine is working compound. Fig. 2 is a view showing the positions of the parts with minimum pressure in low-pressure valve-chest and the engine working simple. Fig. 3 is a view showing the positions of the parts with the maximum pressure in the low-pressure valve-chest and the engine working simple. Fig. 4 is a view showing the positions of the parts when the intercepting-valve is just opening or closing. Figs. 5 and 5ª are end views. Figs. 6, 7, 8, and 9 are views showing the positions of the parts under the various conditions with a modified form of construction of the valve mechanism. Figs. 10, 11, 12, and 13 are views illustrating certain other modifications and the positions of the parts of the mechanism under the various conditions.

With the casing 1, in which my improved valve mechanism is located, a duct 2, leading from the high-pressure cylinder, ducts 3 4, leading to the low-pressure cylinder, and an exhaust-port communicate. An intercepting-valve A is located in said casing, the stem 6 of said valve (which is made with a passage 7 from end to end) having a bearing in a casing E and in a reducing-valve B, the latter being mounted in an independent exhaust-valve C, which is mounted to slide in a casing D. The intercepting-valve A is seated on the casing at *b* when the engine is running simple and on the reducing-valve at G when the engine is running compound. When the valve A is in its open position, as shown in Fig. 1, steam will be permitted to pass from the high - pressure - cylinder exhaust to the low-pressure cylinder. The seat of the reducing-valve is indicated at G at the end of the stem of the intercepting-valve and the seat of the independent exhaust-valve is indicated at F.

The casing D of the high-pressure-cylinder exhaust-valve C is made with a port H, and said valve C is made with a port K. The reducing-valve B is made with a port L. A steam-inlet duct $a$ communicates with the casing E of the intercepting-valve and is adapted to conduct steam thereto from the dry pipe of the engine. A pipe $c$ communicates with the end of the valve-casing D of the valve C and is adapted to conduct steam thereto, the flow of steam through this pipe being controlled by means of a valve in the engine-cab, for a purpose hereinafter explained.

Fig. 1 shows the positions of the parts comprising the valve mechanism when the engine is running compound. In this position the intercepting-valve A is open, allowing the exhausted steam from the high-pressure cylinder to pass freely to the low-pressure valve-chest. The areas of the two sides of the intercepting-valve are about equal, and as both are subjected to the same pressure the valve will be in equilibrium as far as these two surfaces are concerned. The outer end of the intercepting-valve stem is subjected to boiler-pressure at all times when the throttle-valve is open, the passage at the end being connected with the dry pipe, as above explained. The intercepting-valve A having passage 7 through the stem its entire length, the reducing-valve B is therefore subjected to boiler-pressure at all times when the throttle-valve is open on the surface next to the inner end of the intercepting-valve stem. The pressure upon the outer end of the intercepting-valve stem tends to force said stem against the seat G on the reducing-valve B, which may be ground to a joint and thus made secure from leakage. The inner ends of the high-pressure-cylinder exhaust-valve C and the reducing-valve B are subjected to the pressure of the exhausted steam from the high-pressure cylinder. The outer end of the high-pressure exhaust-valve C is subjected to boiler-pressure through the steam-pipe $c$ from a cock in the engine-cab, which can be opened and closed at the will of the engineer. The area of the outer end of the high-pressure-cylinder exhaust-valve C is such that the pressure against it is greater than the sum of all the pressures acting in the opposite direction. It will therefore be held solidly against its seat F. When the parts are in this position, the edges of the ports K and L in the exhaust-valve C and the reducing-valve B, respectively, are pushed beyond the port H in the casing D. It will readily be seen that when the parts are in this position there can be no leakage of steam to the atmosphere. When it is desired to convert the locomotive from a compound to a simple-acting engine, the connection from the outer end of the high-pressure valve C is closed and connection to the atmosphere is opened through the instrumentality of the cock in the engine-cab. The pressure upon the outer end of the high-pressure exhaust-valve being thus removed, the combined pressures upon the inner ends of the high-pressure exhaust-valve C and the reducing-valve B, the pressure upon the outer end of the intercepting-valve stem, and the pressure upon the surface of the reducing-valve next to the inner end of the intercepting-valve stem will tend to open the high-pressure exhaust-valve, and the pressure upon the outer end of the intercepting-valve stem will tend to close the intercepting-valve. The parts will all move together to the position shown in Fig. 4, when the movement of the intercepting-valve will be arrested by contact with its seat, and the pressure upon the surface of the reducing-valve next to the inner end of the intercepting-valve stem will continue the motion of the reducing-valve and the high-pressure exhaust-valve until the port L in the reducing-valve uncovers the inner end of the intercepting-valve stem, when steam at boiler-pressure will enter the low-pressure receiver through the ports L K H. Steam will also enter the passage between the reducing-valve B and the high-pressure exhaust-valve C, thus continuing the movement of the high-pressure exhaust-valve until it reaches the position shown in Fig. 2, where the reducing-valve and the high-pressure exhaust-valve are shown at their greatest opening and the pressure in the low-pressure valve-chest will be at its minimum. As the pressure in the low-pressure valve-chest increases, the reducing-valve will move independently toward the position shown in Fig. 3, where the pressure in the low-pressure valve-chest is at its maximum. This movement of the reducing-valve will take place because the area of the surface next to the high-pressure exhaust-valve is greater than the area of the surface next to the inner end of the intercepting-valve stem. The steam as it comes through the intercepting-valve stem will be reduced in pressure in an inverse ratio to the difference in the area of the two surfaces of the reducing-valve. Steam can thus be furnished to the low-pressure cylinder at such pressure that the work done in the high-pressure cylinder will be equal to the work done in the low-pressure cylinder. When it is desired to convert the engine from a simple to a compound engine, connection from the atmosphere to the outer end of the high-pressure exhaust-valve is closed and connection to the boiler is opened through the steam-cock in the cab. The high-pressure exhaust-valve will then begin to close, the only opposition to its movement being the pressure upon the surface of the high-pressure exhaust-valve next to the reducing-valve. When the high-pressure exhaust-valve reaches the reducing-valve, its movement will also be opposed by the pressure upon the surface of the reducing-valve next to the inner end of the intercepting-valve stem. The high-pressure exhaust-valve and the reducing-valve will then move on together until the reducing-valve comes in contact with the inner end of the intercepting-valve stem, as shown in Fig. 4, when further movement will be opposed by boiler-pressure upon the outer end of the intercepting-valve stem and upon the surface of the reducing-valve stem; also, pressure of the exhausted steam from the high-pressure cylinder upon the inner ends of the high-pressure exhaust-valve and the reducing-valve; also, the receiver-pressure upon one side of the intercepting-valve. The movement of the parts will be aided by the pressure of the exhausted steam from the high-pressure cylinder upon the opposite sides of the intercepting-valve. As the pressure upon the opposite sides of the intercepting-valve approaches equality, the pressure upon the outer end of the high-pressure exhaust-valve will become greater than the combined pressures in opposition to it, and the parts will all move together into the position shown in Fig. 1. In this position the high-pressure exhaust-valve being held solidly against its seat and the intercepting-valve being held solidly against its seat, there can be no leakage of steam to the atmosphere and the engine is working compound.

In the movement of the parts in converting from a compound to a simple engine it will be noticed that the intercepting-valve is closed before the high-pressure exhaust-valve is open to the stack $d$ and before the reducing-valve opens to admit steam to the low pressure cylinder. In converting from a simple to a compound engine the high-pressure exhaust-valve is practically closed and the reducing-valve has cut off steam from the low-pressure cylinder before the intercepting-valve is open.

The difference between the construction shown in Figs. 1 to 4 and that shown in Figs. 6 to 9 is in the reducing-valve. In the latter construction the intercepting-valve stem is bored out and the reducing-valve is placed wholly within the stem, steam is admitted to the receiver at one end of the reducing-valve, and the reducing-valve is closed by pressure at the other end, the shoulder in the center being exposed to atmospheric pressure when the high-pressure exhaust-valve is open to the stack.

In Figs. 10 to 13 the intercepting-valve stem is shown cut off and the reducing-valve takes its bearing on one end of the intercepting-valve stem and on the other end in the high-pressure exhaust-valve. One of the principal features of this construction is that the reducing-valve is open to the atmosphere only when the high-pressure valve is open to the stack and the locomotive is running as a simple engine.

With my improved construction and arrangement of parts the intercepting-valve cannot close without opening the reducing-valve and the high-pressure-cylinder exhaust-valve cannot close without closing the reducing-valve and opening the intercepting-valve.

When the engine is running compound, the intercepting-valve is seated on the reducing-valve and held to its seat by steam-pressure upon the outer end of the intercepting-valve stem, the reducing-valve being held immovable by the steam-pressure upon the outer end of the high-pressure exhaust-valve.

When the parts are in the positions shown in Fig. 3, the high-pressure exhaust-valve forms a piston which closes the opening from the high-pressure exhaust to the stack.

Various slight changes might be made in the details of construction of my invention without departing from the spirit thereof or limiting its scope; and hence I do not wish to limit myself to the precise details of construction herein set forth.

Having fully described my invention, what I claim as new, and desire to secure by Letters Patent, is—

1. In a valve mechanism for compound engines, the combination with a suitable casing, of an intercepting valve adapted to control the passage of steam from the high pressure exhaust to the low pressure receiver, an independent exhaust valve for the high pressure cylinder, a reducing valve, parts of said valves bearing upon one another and means for controlling said valves whereby the engine can be made to operate either as a compound or a simple acting engine, substantially as set forth.

2. In a valve mechanism for a compound engine, the combination with a suitable casing, of an intercepting valve between the high pressure exhaust and the low pressure receiver, an independent exhaust valve for the high pressure cylinder, a reducing valve, parts of said valves all bearing upon one another, and live steam connections with said valve mechanism constructed and adapted to admit steam pressure thereto whereby to control the same to convert the engine from a compound to a simple engine and vice versa, substantially as set forth.

3. In a valve mechanism for a compound engine, the combination with a suitable casing, of an intercepting valve between the high pressure exhaust and the low pressure receiver, the stem of said valve having a steam passage through it, a reducing valve constructed and adapted to control the passage of steam from said steam passage to the low pressure receiver, and an independent exhaust valve adapted to open communication between the exhaust from the high pressure cylinder and the atmosphere and open communication between the reducing valve and the low pressure receiver, said valves all concentric with one another, substantially as set forth.

4. In a valve mechanism for compound engines, the combination with a suitable casing, of an intercepting valve interposed between the high pressure exhaust and the lower pressure receiver, the stem of said valve having a steam passage through it, a reducing valve adapted to control said steam passage and having ports therein, and an independent exhaust valve inclosing the reducing valve and having ports therein adapted to open communication between the ports of the reducing valve and the low pressure cylinder, said independent exhaust valve being also adapted to open and close communication between the high pressure exhaust and the atmosphere, substantially as set forth.

5. In a valve mechanism for compound engines, the combination with a suitable casing, of an intercepting valve between the high pressure exhaust and the low pressure receiver, the stem of said valve having a steam passage through it, a live steam passage communicating with said steam passage in the stem of the intercepting valve, an independent exhaust valve adapted to open and close communication between the high pressure exhaust and the atmosphere and to open and close ports communicating with the low pressure receiver, a reducing valve within the independent exhaust valve adapted to open and close steam passage through the stem of the intercepting valve and having ports to communicate with ports in the independent exhaust valve, and means for admitting steam to one end of the independent exhaust valve, whereby to control the operation of said valves, substantially as set forth.

6. In a valve mechanism for compound engines, the combination with a suitable casing, of an intercepting valve, a high pressure exhaust valve and a reducing valve, said valves concentric with one another and being so constructed and arranged that the intercepting valve cannot close without opening the reducing valve and so that the high pressure exhaust valve cannot close without closing the reducing valve and opening the intercepting valve, substantially as set forth.

7. In a valve mechanism for compound engines, the combination with a suitable casing, of an intercepting valve, a reducing valve adapted to produce a seat for said intercepting valve, means for applying steam pressure to the intercepting valve whereby to retain it on its seat when the engine is running simple, a high pressure exhaust valve, and means for applying steam pressure to said high pressure exhaust valve whereby to hold the reducing valve immovable when the engine is running compound, substantially as set forth.

8. In a valve mechanism for compound engines, the combination with a casing, of an intercepting valve, a reducing valve and a high pressure exhaust valve, said valves all concentric with one another and said high pressure exhaust valve being adapted to form a piston to close the opening from the high pressure exhaust chamber to the stack, substantially as set forth.

9. In a valve mechanism, the combination with a casing, of an intercepting valve, a reducing valve and a high pressure exhaust valve, said valves being concentric with one another and so constructed and arranged that when the engine is being converted from a simple to a compound engine the exhaust opening to the stack will be closed before the intercepting valve is opened and so that when converting from a compound to a simple engine the intercepting valve will be closed before the exhaust chamber is open to the stack, substantially as set forth.

In testimony whereof I have signed this specification in the presence of two subscribing witnesses.

DAVID SHIRRELL.

Witnesses:
   SERVETUS BISPHAN,
   ALEXANDER CRUICKSHANKS.